(12) United States Patent
Schneider et al.

(10) Patent No.: US 8,191,123 B2
(45) Date of Patent: May 29, 2012

(54) PROVISIONING A NETWORK APPLIANCE

(75) Inventors: James P. Schneider, Raleigh, NC (US); Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 1010 days.

(21) Appl. No.: 11/998,098

(22) Filed: Nov. 27, 2007

(65) Prior Publication Data
US 2009/0138947 A1 May 28, 2009

(51) Int. Cl.
*G06F 21/00* (2006.01)
(52) U.S. Cl. .......................................... 726/5; 713/156
(58) Field of Classification Search ................ 726/5, 10; 713/2, 155, 156, 175, 178
See application file for complete search history.

(56) References Cited

U.S. PATENT DOCUMENTS

| | | | |
|---|---|---|---|
| 5,872,966 A | 2/1999 | Burg | |
| 6,144,965 A | 11/2000 | Oliver | |
| 6,212,563 B1* | 4/2001 | Beser | 709/227 |
| 6,721,733 B2 | 4/2004 | Lipson et al. | |
| 6,847,959 B1 | 1/2005 | Arrouye et al. | |
| 6,996,832 B2 | 2/2006 | Gunduc et al. | |
| 7,003,527 B1 | 2/2006 | Lavallee et al. | |
| 7,254,814 B1 | 8/2007 | Cormier et al. | |
| 7,509,638 B2 | 3/2009 | Backhouse et al. | |
| 7,568,095 B2* | 7/2009 | Thornton et al. | 713/156 |
| 7,650,397 B2 | 1/2010 | Price et al. | |
| 7,673,143 B1* | 3/2010 | Yeager et al. | 713/175 |
| 7,702,902 B2 | 4/2010 | Thayer et al. | |
| 7,707,405 B1 | 4/2010 | Gilman et al. | |
| 2001/0028647 A1* | 10/2001 | Teraoka | 370/389 |
| 2002/0116453 A1 | 8/2002 | Todorov et al. | |
| 2003/0037237 A1* | 2/2003 | Abgrall et al. | 713/166 |
| 2003/0158957 A1 | 8/2003 | Abdolsalehi | |
| 2004/0068586 A1 | 4/2004 | Xie et al. | |
| 2004/0093499 A1* | 5/2004 | Arditi et al. | 713/176 |
| 2004/0148185 A1 | 7/2004 | Sadiq | |
| 2005/0033794 A1 | 2/2005 | Aridor et al. | |
| 2005/0125411 A1 | 6/2005 | Killian et al. | |
| 2005/0235352 A1* | 10/2005 | Staats et al. | 726/14 |
| 2006/0004689 A1 | 1/2006 | Chandrasekaran et al. | |
| 2006/0059111 A1 | 3/2006 | Tucker et al. | |
| 2006/0074975 A1 | 4/2006 | Tunar et al. | |
| 2007/0074119 A1 | 3/2007 | Komine et al. | |
| 2007/0100965 A1 | 5/2007 | Schweier | |
| 2008/0004887 A1 | 1/2008 | Brunswig et al. | |

(Continued)

OTHER PUBLICATIONS

Kaufman et al. "Network Security: Private Communication in a Public World", second edition, Prentice Hall Series in Computer Networking and Distributed Systems, 2002, pp. 311-313, ISBN: 0-13-046019-2.*

(Continued)

*Primary Examiner* — Hadi Armouche
(74) *Attorney, Agent, or Firm* — Lowenstein Sandler PC

(57) ABSTRACT

A method and system for generating identity certificates. The method may include receiving a user login at a network appliance, determining that the network appliance is not initialized, and generating a provisionally unique identifier from the network appliance for identifying the network appliance. The method may include generating a certificate signing request (CSR) and sending the CSR, the provisionally unique identifier, and information about the user login to a service provider. Upon receiving a signed certificate from the service provider at the network appliance, the network appliance is initialized using the received signed certificate.

18 Claims, 6 Drawing Sheets

U.S. PATENT DOCUMENTS

| | | | |
|---|---|---|---|
| 2008/0022103 A1* | 1/2008 | Brown et al. | 713/175 |
| 2008/0071796 A1 | 3/2008 | Ghuneim et al. | |
| 2008/0092234 A1 | 4/2008 | Circenis | |
| 2008/0114770 A1 | 5/2008 | Chen et al. | |
| 2008/0189651 A1 | 8/2008 | Reveman | |
| 2008/0235710 A1 | 9/2008 | Challenger et al. | |
| 2008/0307508 A1* | 12/2008 | Conley et al. | 726/4 |
| 2009/0031410 A1* | 1/2009 | Schneider et al. | 726/10 |
| 2009/0064127 A1* | 3/2009 | Schneider | 717/170 |
| 2009/0100512 A1* | 4/2009 | Schneider | 726/10 |
| 2009/0132681 A1* | 5/2009 | Schneider | 709/219 |
| 2009/0138946 A1* | 5/2009 | Schneider et al. | 726/5 |
| 2009/0138947 A1 | 5/2009 | Schneider et al. | |
| 2009/0144399 A1* | 6/2009 | Schneider | 709/220 |

OTHER PUBLICATIONS

Red Hat Command Center 3.18, Check Reference, Red Hat, Inc., 2007, 178 pages.

Red Hat Command Center, Users Guide 3.18, Red Hat, Inc., 2007, 318 pages.

Red Hat Command Center, Release Notes 3.18, Red Hat, Inc., 2007, 7 pages.

Red Hat Command Center 3.18, Setup and Installation Guide, Red Hat, Inc., 2007, 33 pages.

Woods, Will. "git://git.fedorahosted.org/snake/commitdiff", http://git.fedorahosted.org/git/snake?p;=snake;a=commitdiff;h=a2cb4fcae9531e22d2fa3d... Aug. 22, 2007, 2 pages.

Office Action of U.S. Appl. No. 11/880,806 mailed Oct. 13, 2010.

Office Action of U.S. Appl. No. 11/985,669 mailed Apr. 1, 2010.

Office Action of U.S. Appl. No. 11/985,669 mailed Sep. 29, 2009.

Office Action of U.S. Appl. No. 11/998,097 mailed Mar. 24, 2011.

Woods, Will. "git://git.fedorahosted.org/snake/committdiff", http://git.fedorahosted.org/git/snake?p;=snake;a=committdiff;h=a2cb4fcae9531e22d2fa3d... Aug. 22, 2007, 2 pages.

Office Action of U.S. Appl. No. 11/880,806 mailed Mar. 21, 2011.

Office Action of U.S. Appl. No. 11/880,806 mailed Jul. 25, 2011.

Office Action of U.S. Appl. No. 11/985,669 mailed Nov. 4, 2011.

Office Action of U.S. Appl. No. 11/985,669 mailed Jun. 1, 2010.

Office Action of U.S. Appl. No. 11/998,097 mailed Aug. 3, 2011.

* cited by examiner

PROVISIONING A NETWORK APPLIANCE

TECHNICAL FIELD

Embodiments of the present invention relate to authentication mechanisms for network devices, and more specifically to generation of identity certificates for network devices and activation of network appliances.

BACKGROUND

Networked computers are used to transmit and fetch information to and from local sources (e.g., computers used in a business) and remote sources (e.g., enterprise services offered over the internet). To ensure privacy and security during communication between networked computers, authentication and verification mechanisms may be used. One such mechanism is a public key infrastructure system, in which networked devices use signed identity certificates for authentication and/or verification purposes.

In public key infrastructure systems, a certificate signing request (CSR) is a message sent from an applicant to a certificate authority in order to apply for a signed identity certificate. Before creating a CSR, the applicant first generates a key pair (including a public key and a private key), keeping the private key secret. The CSR contains information identifying the applicant (such as a distinguished name of the subject in the case of an X.509 certificate), and the public key generated by the applicant. The identifying information is commonly entered manually by a user. In conventional systems, the CSR is also accompanied by credentials or proofs of identity. Moreover, the certificate authority may contact the applicant for further information. If the request is successful (e.g., if the identifying information, credentials and proofs of identity are satisfactory), the certificate authority will send back an identity certificate (also known as a digital certificate, signed certificate, public key certificate, etc.) that has been digitally signed with the private key of the certificate authority. This identity certificate may thereafter be used by the applicant to authenticate and/or verify itself to networked devices that trust the certificate authority.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1A:
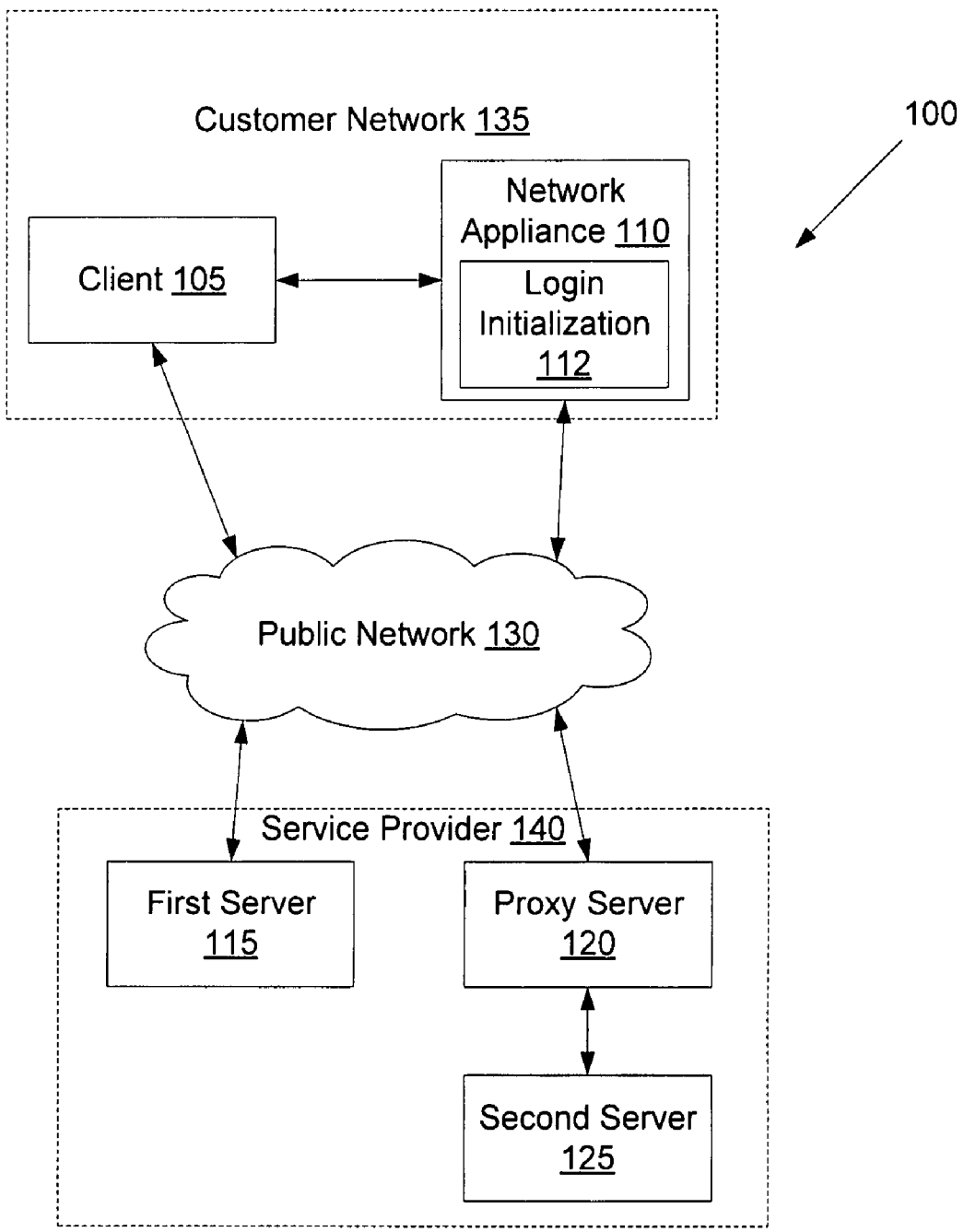
FIG. 1A illustrates an exemplary network architecture in which embodiments of the present invention may operate.

Described herein is a method and system for generating identity certificates with minimal user input. In one embodiment, a network appliance generates a provisionally unique identifier. The network appliance embeds the provisionally unique identifier into a certificate signing request (CSR). A user provides login information to the network appliance. The network appliance uses the provided login information to log into a backend server (such as a server hosted by a service provider) where the network appliance presents the CSR. The backend server validates the uniqueness of the identifier, signs the CSR, generates and signs a certificate, and transfers the certificate to the network appliance.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The description that follows details a system, apparatus, and method for generating identity certificates for devices with minimal user input. Such identity certificates may be generated without a user providing or knowing information about the device (such as configuration information, credential information of the device, identifying information of the device, etc.). Therefore, the device may be activated, configured and/or authenticated by a user without the user even being aware of the identity certificate process. In one embodiment, to initiate generation of the identity certificate, a user may log into a network appliance, and the network appliance negotiates with a backend server for the identity certificate without further input from the user.

The automated nature of the activation, configuration and authentication in embodiments of the present invention may reduce the occurrence of user error in setting up a network appliance. In conventional methods for example, a user would have to type in the IP address of the the device to be activated. In many cases the user would incorrectly type in the IP address, which would stymie the activation of the device. Users, being unaware of the incorrect number being supplied, would often call "tech support" to help in resolving the problem. Additionally, new IP addresses might be assigned to the device before the device is activated, which would also cause terminal errors in the installation process.

FIG. 1A illustrates an exemplary network architecture 100 in which embodiments of the present invention may operate. The network architecture 100 may include a service provider 140 connected with a customer network 135 (e.g., a local area network (LAN), wide area network (WAN), intranet, etc.) over a public network 130 (e.g., the internet). Alternatively, the customer network 135 may be connected with the service provider 140 via a private network (not shown) (e.g., an intranet, virtual private network (VPN), etc.).

Network architecture 100 may enable service provider 140 to provide services targeted to, and/or dependent on, specific devices (e.g., network appliance 110) of customer network 135. To provide such services, it may be necessary for the specific device to authenticate itself to service provider 140. Such authentication may be achieved using an identity certificate. In one embodiment, the identity certificate is generated as part of activating and/or configuring a new device. Alternatively, generation of the identity certificate may occur separately from device activation and configuration.

Referring to FIG. 1A, the customer network 135 may represent a network of an enterprise and may include such devices as desktop computers, laptop computers, network printers, switches, routers, gateways, firewalls, or any other devices having a network address. In one embodiment, the customer network 135 also includes a client 105 and a network appliance 110. For example, client 105 may be a device operated by an IT administrator or some other user as a user interface to communicate with the network appliance 110. The network appliance 110 may be a computing device that is configurable over a network. In other embodiments, the customer network 135 may include different combinations of clients, network appliances, switches, routers, gateways, etc.

The client 105 and the network appliance 110 may each be a computing device such as, for example, a desktop computer, laptop computer, server, etc. In an example, the network appliance 110 is configured to perform a network related function (e.g., network monitoring) upon connection with the customer network 135. The network related function can be automatically initiated once the network appliance 110 receives an identity certificate and/or configuration information.

In one embodiment, configuration for the network appliance is automatically accomplished when a user logs into the network appliance. When the user logs onto the network appliance that does not have a certificate for communicating with a service provider, the network appliance generates a provisionally unique identifier (ID) and sends the provisionally unique ID, a CSR, and user credentials to the service provider. The service provider evaluates the supplied information, signs the certificate, and sends the signed certificate back to the network appliance. Thus, the network appliance can be activated without the user being aware of the activation process and with a much-reduced chance of error.

Service provider 140 provides one or more services to customer network 135. In one embodiment, service provider 140 hosts a network and systems management and monitoring tool (NSMMT) that collects information about the customer network 135 and devices on the customer network 135, and presents this information to a user such as an IT administrator (e.g., via client 105). Alternatively, the service provider 140 may provide other services, such as intranet indexing services, etc. The service provider 140 includes one or more servers (e.g., first server 115, proxy server 120, and second server 125). In one embodiment, the service provider 140 includes a separate and distinct first server 115, proxy server 120 and second server 125. In another embodiment, the first server 115 and second server 125 are co-located on a computing device, and no proxy server 120 is present. Alternatively, other server configurations may be implemented (e.g., service provider 140 may include more or fewer servers, which may have redundant or different functionality).

First server 115 may be a front end server that provides an interface to client 105 of customer network 135. Through the first server 115, users of customer network 135 may request data, initiate actions, receive information, etc. Network appliance 110 may also communicate with first server 115, for example, to request a service, initiate an action, report data, etc. In one embodiment, first server 115 is a web application server that provides a web application interface accessible to network appliance 110 via a web browser. The network appliance 110 can use a provisioning URL (or CLI interface, for example) to automatically negotiate a setup script with one or more of service provider 140 servers. The setup can often be accomplished without awareness of the setup process by the user.

Second server 125 may be a back end server that communicates with the network appliance 110 of customer network 135 to send and/or receive such data as identity certificate information, network status updates, transactions, etc. Second server 125 may also communicate data to and/or from client 105. In one embodiment, second server 125 communicates with the network appliance 110 and/or client 105 through proxy server 120. Proxy server 120 receives transmissions and, if appropriate, forwards them to second server 125. Alternatively, no proxy server 120 may be present, or multiple proxy servers may be used.

Figure 1B:
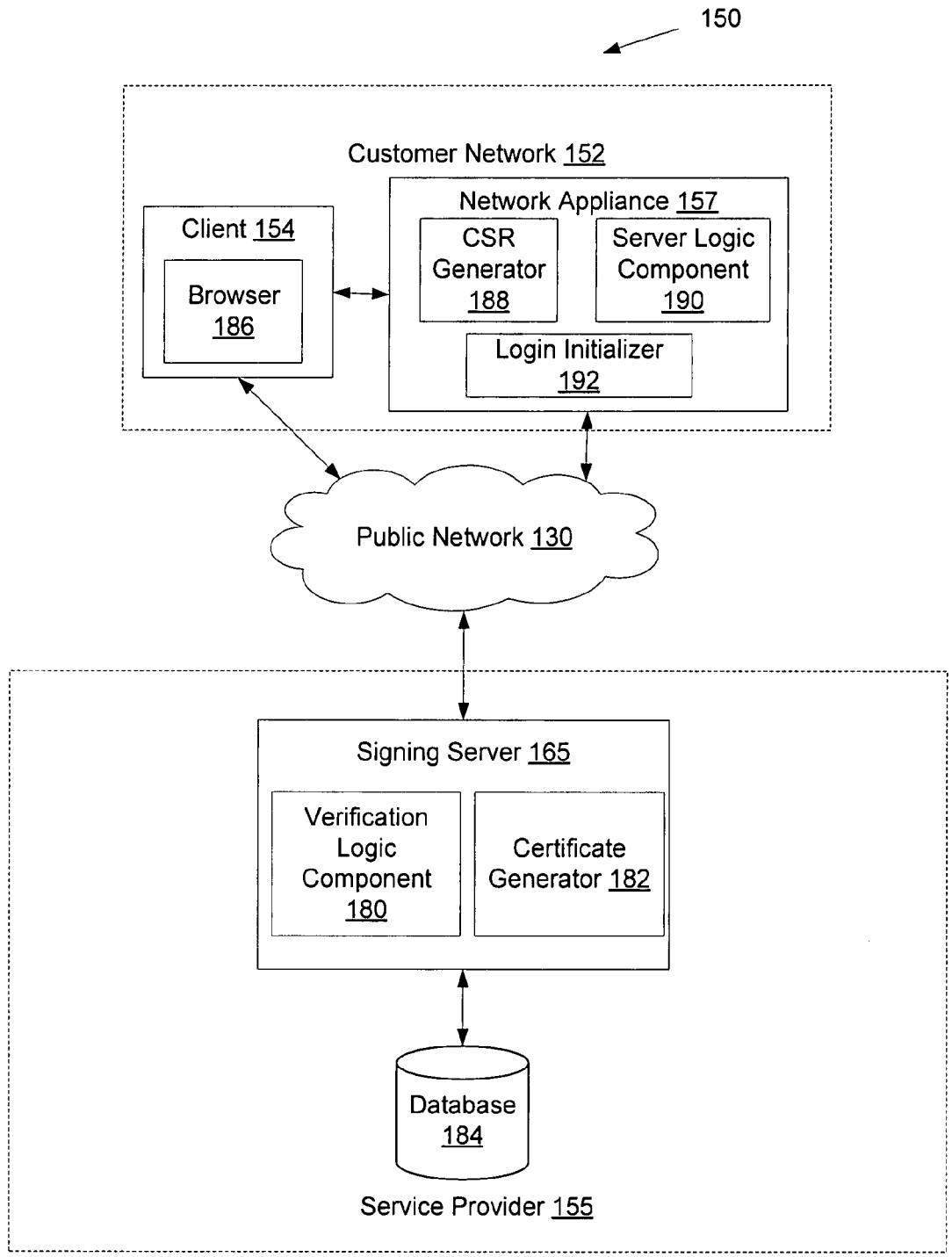
FIG. 1B illustrates another exemplary network architecture, in which further embodiments of the present invention may operate.

FIG. 1B illustrates another exemplary network architecture 150, in which further embodiments of the present invention may operate. The network architecture 150 may include a service provider 155 connected with a customer network 152 over a public network 130 (e.g., the internet) or a private network (not shown).

The customer network 152 may include a client 154 and a network appliance 157. For example, client 154 may be a device operated by an IT administrator or some other user as a user interface to communicate with the network appliance 157. Alternatively, the customer network 152 may include different combinations of clients, network appliances, switches, routers, gateways, and the like.

The client 154 and the network appliance 157 may each be a computing device such as, for example, a desktop computer, laptop computer, server, etc. In one embodiment, client 154 hosts a browser 186. Browser 186 is an application that enables client 154 to display and interact with text, images, and other information provided by a server such as the server logic component 190 of network appliance 157.

Network appliance 157 may include a certificate signing request (CSR) generator 188, a server logic component 190, and a login initializer 192. Server logic component 190 may be a server application that resides on network appliance 157. Server logic component 190 may receive requests (e.g., for web pages, for specified information, to initiate an action, etc.), provide data, and/or perform other server functions. In one embodiment, server logic component 190 presents data in a form navigable by browser 186.

In operation, login initializer 192 receives a user login from a user when the network appliance is to be initialized. It can be determined whether the network appliance has been initialized by, for example, determining whether a signed certificate for the signing server 165 exists. When initialization needs to be performed, CSR generator 188 may generate a CSR automatically upon receiving a login from a user directly on the network appliance 157 and/or via client 154. In one embodiment, the login initializer 192 can check for the presence of a valid identity certificate and notify the CSR generator 188 when a valid identity certificate is not found. Alternatively (or in the conjunctive), the CSR generator 188 can be notified upon failure of the signing server 165 to recognize credentials supplied by the network appliance 157.

Generation of a CSR may include generating a public key pair that includes a related public key and private key. Data encrypted with the public key can normally only be decrypted by the private key, and data encrypted with the private key can normally only be decrypted with the public key. The key generation can be performed by the network appliance 157 or by a third party trusted for key generation. Also the network appliance 157 can request a key pair from the signing server 165.

A provisionally unique identifier that is provided by the network appliance 157 is normally included with the CSR. The CSR may include additional information such as credential information, information about the network appliance, and the like. The CSR may then be signed by the private key, and sent to a certificate authority (e.g., signing server 165 of service provider 155).

Service provider 155 may include a signing server 165, and a database 184. Signing server 165 may be a back end server that provides identity certificates. Signing server 165 may act as a certificate authority (CA), and provide identity certificates that can be used to authenticate devices (e.g., network appliance 157). In one embodiment, certificates provided by signing server 165 are used to authenticate network appliances to servers that trust signing server 165. In one embodiment, signing server 165 includes a verification logic component 180 and a certificate generator 182.

Certificate generator 182 signs certificate signing requests (CSRs) to generate identity certificates. Before a certificate is generated, verification logic component 180 verifies that a received CSR should be signed. Such a verification includes analyzing the provisionally unique identifier provided by network appliance 157 to determine whether the provisionally unique identifier is unique from the standpoint of signing server 165. The verification may also include comparing a transaction identifier (e.g., transaction token and/or timestamp) to a CSR, comparing the transaction identifier to a list of valid transaction identifiers, and the like. In one embodiment, a message is generated and transmitted to an originator of the CSR when the provisionally unique identifier is not determined to be unique from the standpoint of signing server 165. When network appliance 157 receives the message and generates a response containing a subsequent provisionally unique identifier (that is found to be unique), the certificate may be generated. If any one of the verification mechanisms fails, the certificate may not be generated.

Figure 2:
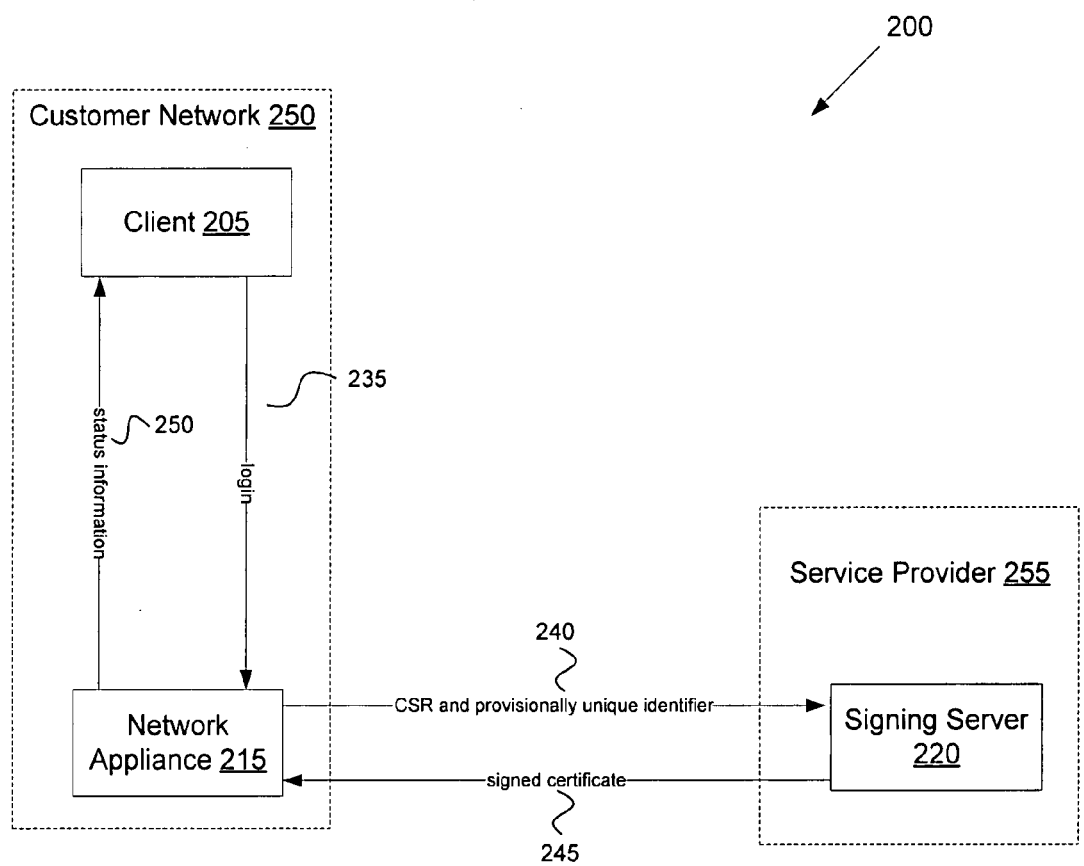
FIG. 2 illustrates a data flow diagram 200 that shows data transmitted between a customer network 250 and a service provider 255, in accordance with one embodiment of the present invention.

FIG. 2 illustrates a data flow diagram 200 that shows data transmitted between a customer network 250 and a service provider 255, in accordance with one embodiment of the present invention. Preferably each transmission is achieved using a secure channel (HTTPS), and the like. Alternatively, an unsecure channel may be used for transmission of, for example, an identity certificate. In one embodiment, the customer network 250 and service provider 255 correspond to customer network 135 and service provider 140 of FIG. 1A. In another embodiment, customer network 250 and service provider 255 correspond to customer network 152 and service provider 155 of FIG. 1B.

Referring to FIG. 2, in a first transmission 235 a user logs in to network appliance 215. The user may login directly to network appliance 215 or login via client 205 as illustrated in the figure. The user typically supplies credentials such as a user name and password combination to gain access to network appliance 215. When network appliance 215 is being initialized, default credentials may be used. Upon receiving the login information (and determining that no signed certificate from the service provider exists), the network appliance starts the "user-free" initialization process.

In response to receiving the login request when being initialized, network appliance 215 generates a provisionally unique identifier for network appliance 215. The provisionally unique identifier can be a universally unique identifier or can be generated based on, for example, information believed by the network appliance to be unique (such as a NIC card address, serial number, and the like) and/or a pseudo-random number generation (such as hash algorithms). Network appliance 215 generates a CSR that includes the provisionally unique identifier (other information can be included such as the user-entered credentials, a transaction token, and a timestamp). In one embodiment, the CSR is sent by network appliance 215 as transmission 240 to signing server 220. Alternatively, transmission 240 may be sent to a proxy server (not shown) that forwards the transmission to signing server 220. Network appliance 215 may then wait for a response from the signing server 220 that includes an identity certificate, or monitor a location for a posting of the identity certificate.

Signing server 220 may analyze the CSR to determine whether it is genuine, and thus whether an identity certificate should be signed. Such an analysis may include determining the uniqueness of the provisionally unique identifier, examining the user credentials, sending a challenge to the network appliance 215 using a public key included in the CSR, and the like. If the CSR is believed to be genuine, signing server 220 signs the identity certificate of network appliance 215.

Once an identity certificate is signed, signing server 220 may send transmission 245 to network appliance 215 that includes the identity certificate. Alternatively, signing server 220 may post the signed identity certificate to a location monitored by network appliance 215. The network appliance 215 may then detect and download the identity certificate. Network appliance 215 may store the identity certificate, and may thereafter use the identity certificate to authenticate itself to one or more servers of service provider 255.

A transmission 250 may then be sent from network appliance 215 to client 205 including status information. The status information may inform client 205 whether the network appliance 215 has been successfully activated and/or whether an identity certificate was successfully installed. In one embodiment, transmission 250 is a web page redirect that redirects the client 205 to a web page. If the certificate was successfully installed, then the redirect may be a redirect to a web page stating that the network appliance 215 was successfully activated. If the certificate was not successfully installed, then the redirect may be a redirect to a web page stating that an error occurred in activation of the network appliance 215.

Figure 3:
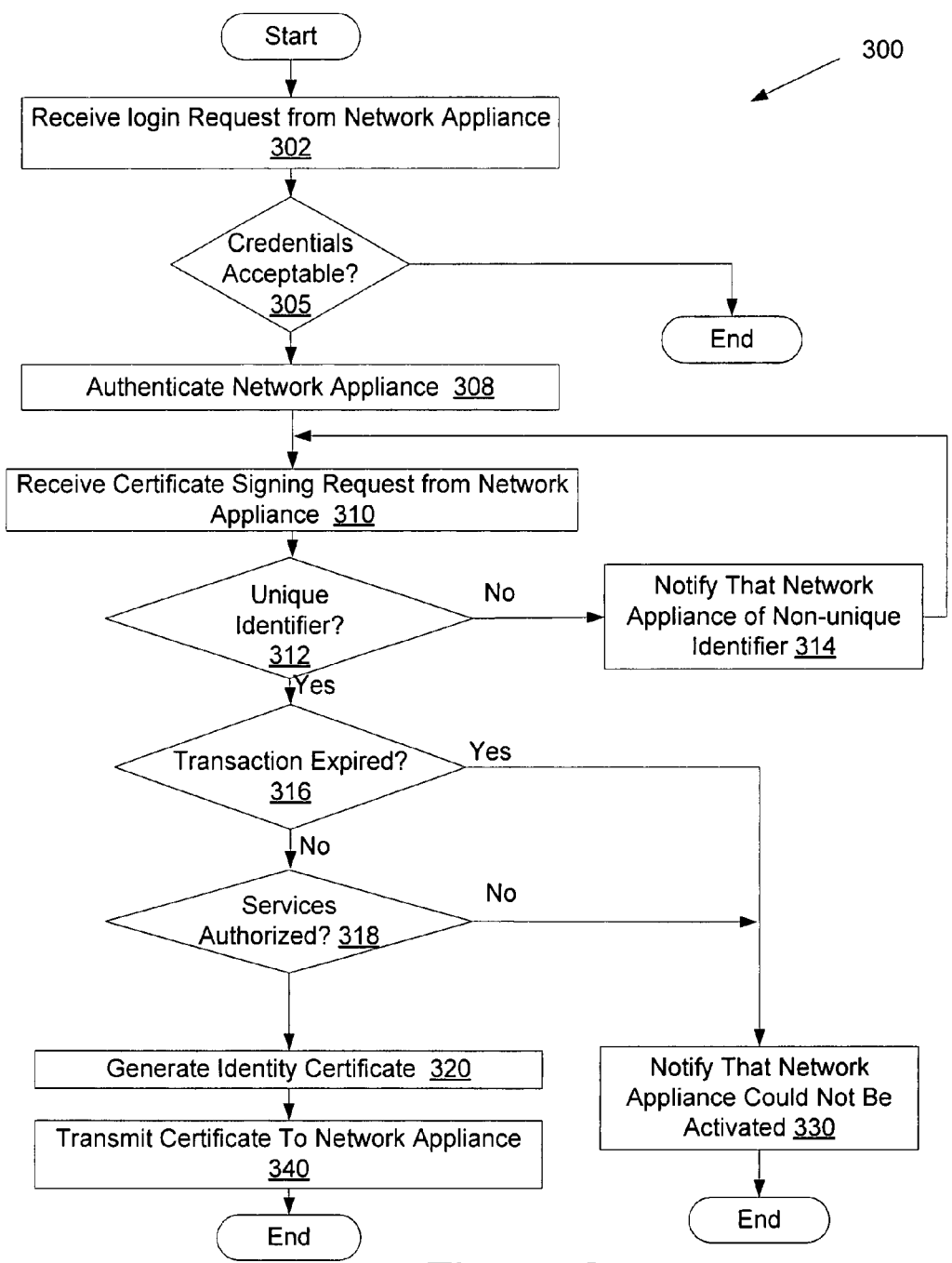
FIG. 3 is a flow diagram illustrating one embodiment of a method for activating a network appliance.

FIG. 3 is a flow diagram illustrating one embodiment of a method 300 for activating a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a service provider, such as service provider 140 of FIG. 1A, service provider 155 of FIG. 1B, or service provider 255 of FIG. 2.

Referring to FIG. 3, method 300 begins with processing logic receiving a login request from a network appliance (block 302) to initialize the network appliance. At block 305, processing logic determines whether acceptable credentials or authentication information (e.g., a user name and password) have been provided by the network appliance. If the method, for example, recognizes the user name and/or other associated credentials for a particular user, the credentials can be accepted. If the login request is accompanied by acceptable credentials or authentication information, then the method proceeds to block 308, and the network appliance is authenticated. If no credentials were provided, or if unacceptable credentials were provided, then the method ends.

At block 310, a certificate signing request (CSR) is received from the network appliance. The CSR may have been automatically generated by the network appliance upon login of the user when the network appliance has no signed certificate.

At block 312, processing logic determines whether the provisionally unique identifier in the CSR is unique. If the provisionally unique identifier in the CSR is not unique, the method proceeds to block 314, where the network appliance is notified that the provisionally unique identifier was not unique. Upon such notification, the network appliance can generate another provisionally unique identifier and try again via another CSR. The process loop can be repeated until successful. Various methods (including using MAC addresses, BIOS serial numbers, CPU identifiers, one-way hash functions, and the like) can be used to generate the provisionally unique identifier. When the provisionally unique identifier is unique, the method proceeds to block 316.

At block 316, time information is compared to determine whether the activation of the network appliance is timely. The time information can be a timestamp of the CSR, revision number of software in the client, and the like. If the transaction has expired, the method proceeds to block 330. If the transaction has not expired, the method proceeds to block 318.

At block 318, processing logic optionally determines whether data within the CSR (such as whether the user credentials have a corresponding entry in a database) indicates whether the user is authorized to receive an identity certificate. If the data in the CSR indicates the client is authorized, the method proceeds to block 320. Otherwise, the method proceeds to block 330.

At block 330, the client is notified that the network appliance could not be activated. The method then ends.

At block 320, an identity certificate is signed. At block 340, the signed certificate is then transmitted to the network appliance. Thereafter, the network appliance may authenticate itself using the signed certificate.

Once the identity certificate has been sent to the network appliance, the network appliance may be automatically configured. In one embodiment, configuration information specific to the network appliance is associated with the signed certificate. Therefore, for example, if an update for the network appliance is available, the update may be provided to the network appliance automatically once the network appliance authenticates itself using the signed certificate.

Figure 4:
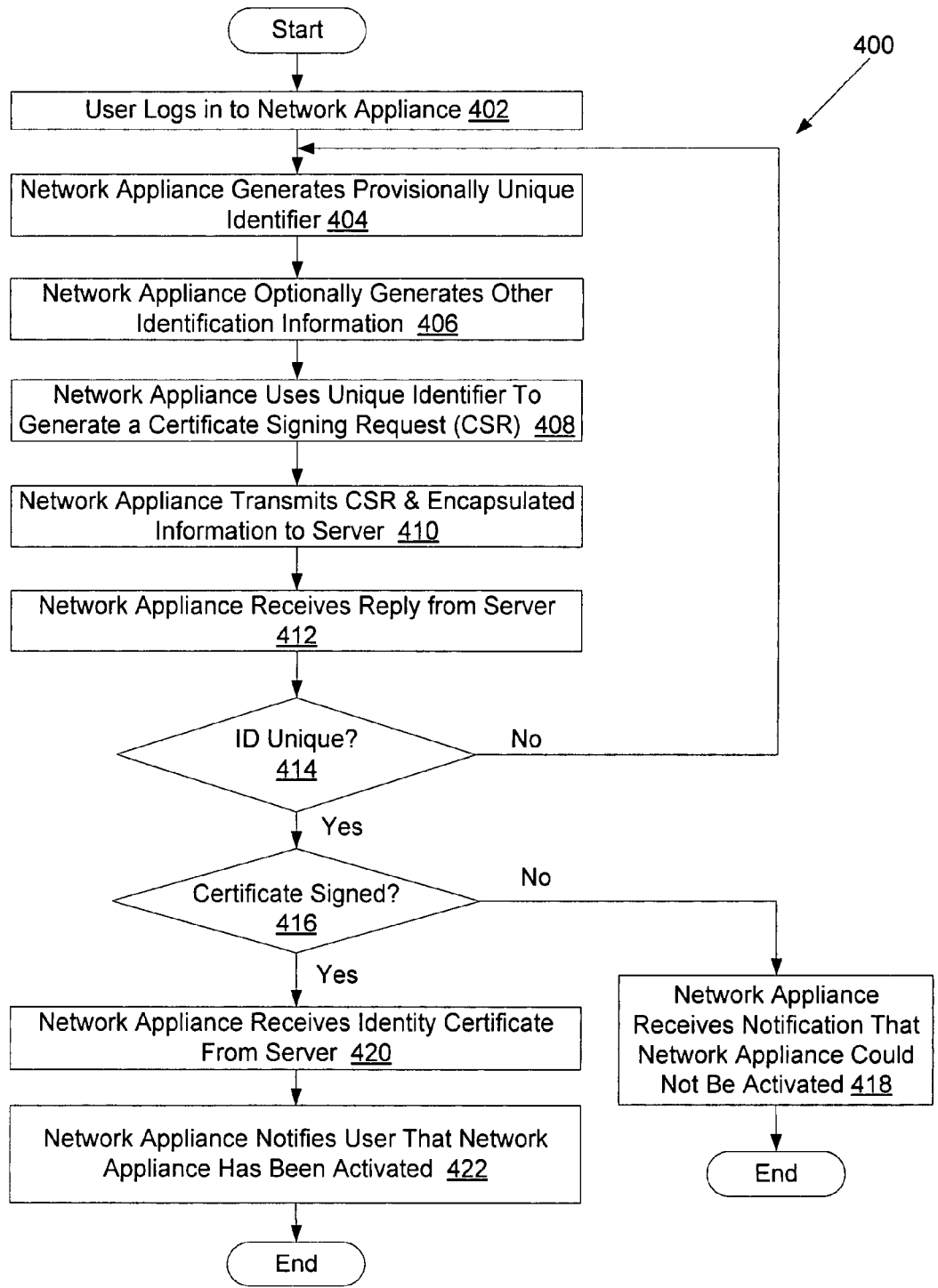
FIG. 4 is a flow diagram illustrating another embodiment of a method for activating a network appliance.

FIG. 4 is a flow diagram illustrating another embodiment of a method 400 for activating a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by devices in a customer network, such as customer network 135 of FIG. 1A, customer network 152 of FIG. 1B, or customer network 250 of FIG. 2.

Referring to FIG. 4, method 400 begins with receiving login information from a user (block 402). The login information may include credentials or authentication information (e.g., a user name and password and/or biometric identification).

At block 404, the network appliance detects that it has not yet been activated (for example, by the lack of a signed certificate) and prepares for the activation by generating a provisionally unique identifier. At block 406, the network appliance optionally determines other identifying information such as the login credentials of the user, the network appliance location (e.g., a MAC address), configuration information, time-stamp information, or credential information for the network appliance. In one embodiment, the user request includes a location of the network appliance. At block 408, the network appliance generates a Certificate Signing Request (CSR) that includes the provisionally unique identifier and optionally includes the other identifying information. In an alternative embodiment, the user credentials and/or the provisionally unique identifier can be sent to the server in a transmission that is separate from the CSR request.

At block 410, the network appliance transmits the CSR and encapsulated information to the server to request activation for a network appliance. The server evaluates information contained in the request to determine whether to grant the CSR. The server evaluates whether the provisionally unique identifier is sufficiently unique with respect to server. If so, the server may decide to grant the request. The server may optionally decide to evaluate other information in the CSR such as the user credentials to determine whether to grant the request. In block 412, the network appliance receives the server's reply indicating a status of the CSR request.

In block 414, if the provisionally unique identifier is not unique to the server, the processing continues at block 404 where another provisionally unique identifier is generated. If the provisionally unique identifier is unique to the server, the processing continues at block 416.

In block 416, if the the server has determined that the CSR will not be signed, the processing continues at block 418 where the network appliance receives notification that the network appliance could not be activated. The notification may include an indication of why the network appliance could not be activated (e.g., time limit expired, CSR didn't match provided user credentials, appliance failed to present valid user credentials, and the like). If the server has signed the CSR and returned the corresponding certificate, the processing continues at block 420.

At block 420, the network appliance identifier receives an identity certificate from the server. The network appliance may also receive a notification that includes a redirect to a provisioning URL. At block 442, the network appliance notifies the user that the network appliance has been successfully activated.

Figure 5:
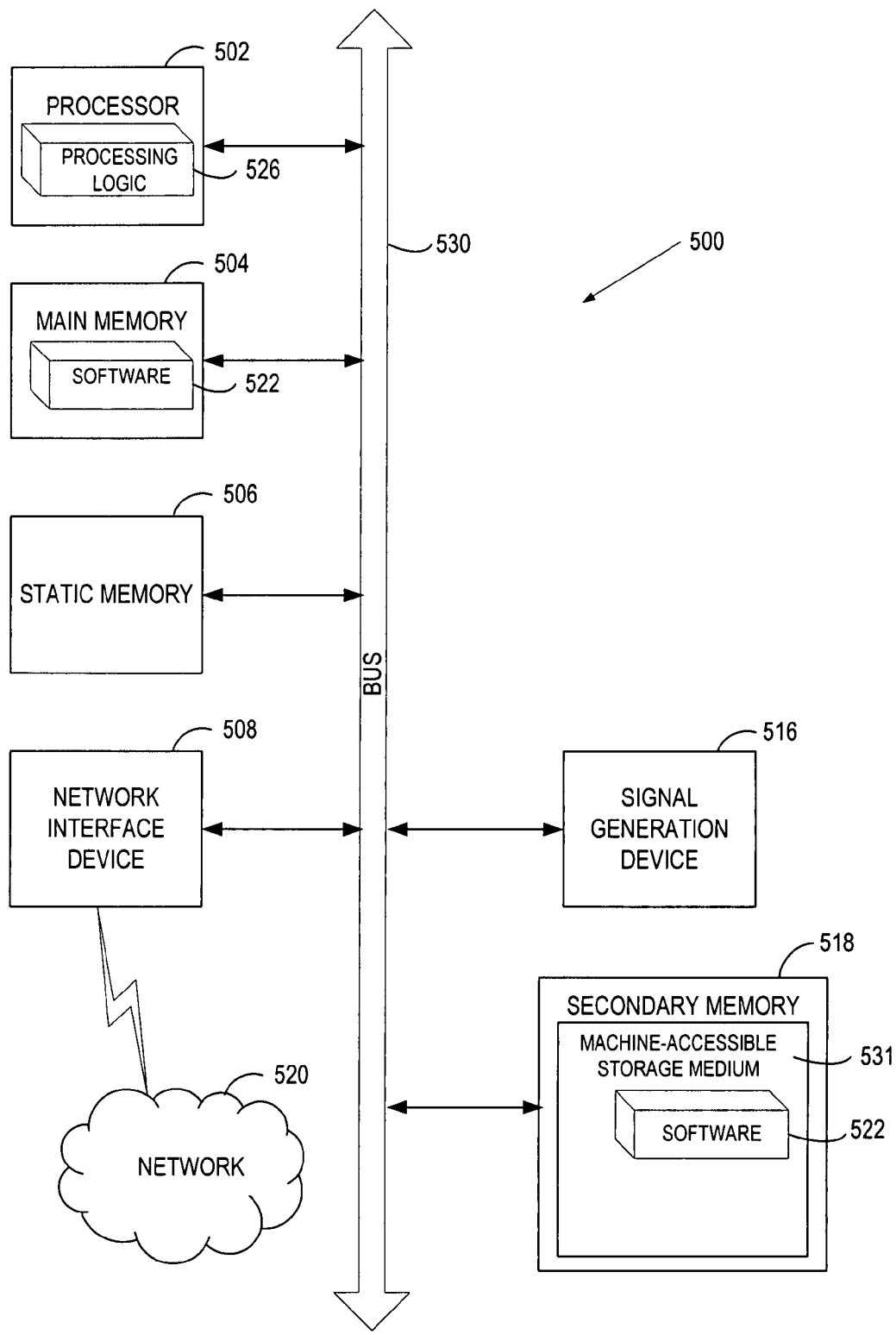
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115, a back end server 125, a client 105, a network appliance 110, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alphanumeric input device (e.g., a keyboard), and/or a cursor control device(e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
receiving a user login at a network appliance; and
initializing the network appliance without user input in response to receiving the user login, the initializing comprising:
 determining that the network appliance is not initialized;
 generating a provisionally unique identifier from the network appliance for identifying the network appliance;
 generating, by the network appliance, a digital certificate signing request (CSR);
 sending a message to a service provider, the message comprising the CSR, the provisionally unique identifier, time information associated with the CSR and information about the user login;
 receiving a signed certificate from the service provider at the network appliance, wherein the signed certificate was generated in response to the message having been evaluated to determine whether the provisionally unique identifier is unique to the service provider and whether the time information indicates that the message was received within a predetermined time period; and
 initializing the network appliance using the received signed certificate.

2. The method of claim 1, wherein the user login comprises a user name.

3. The method of claim 1, wherein the provisionally unique identifier is not known beforehand by the network appliance.

4. The method of claim 1, wherein the determination that the network appliance is not initialized is made by evaluating whether the network appliance has a signed certificate.

5. The method of claim 1, wherein the provisionally unique identifier is generated using a location of the network appliance, the location including an IP address.

6. A computer implemented method, comprising:
receiving a user login at a network appliance; and
initializing the network appliance without user input in response to receiving the user login, the initializing comprising:

determining whether the network appliance comprises a signed certificate from a service provider;

if the network appliance does not have a signed certificate, generating a digital certificate signing request (CSR) by the network appliance that includes a provisionally unique identifier for identifying the network appliance;

sending a message to a service provider, the message comprising the CSR, time information associated with the CSR and the provisionally unique identifier, to determine whether the network appliance is to be activated; and in response to receiving a signed certificate, initializing the network appliance, wherein the signed certificate was generated in response to the message having been evaluated to determine whether the provisionally unique identifier is unique to the service provider and whether the time information indicates that the message was received within a predetermined time period.

7. The method of claim 6, wherein the CSR comprises user credentials of a user who has logged into the network appliance.

8. The method of claim 7, further comprising sending a notification message to the user that the network appliance has been activated.

9. The method of claim 6, wherein the CSR includes configuration information, or credential information for the network appliance.

10. A non-transitory machine-accessible medium including instructions that, when executed by a network appliance, cause the network appliance to perform a computer implemented method comprising:

initializing the network appliance without user input in response to receiving a user login at the network appliance, the initializing comprising:

determining that the network appliance is not initialized;

generating a provisionally unique identifier by the network appliance for identifying the network appliance;

generating a certificate signing request (CSR) by the network appliance;

sending a message to a service provider, the message comprising the CSR, time information associated with the CSR and the provisionally unique identifier;

receiving a signed certificate from the service provider at the network appliance, wherein the signed certificate was generated in response to the message having been evaluated to determine whether the provisionally unique identifier is unique to the service provider and whether the time information indicates that the message was received within a predetermined time period; and initializing the network appliance using the received signed certificate.

11. The non-transitory machine-accessible medium of claim 10, further comprising receiving credential information of a user logged into the network appliance.

12. The non-transitory machine-accessible medium of claim 10, wherein the provisionally unique identifier is not known beforehand by the network appliance implementing the method.

13. The non-transitory machine-accessible medium of claim 10, wherein the certificate signing request has been automatically generated by the network appliance upon a user logging into the network appliance.

14. The non-transitory machine-accessible medium of claim 10, further including instructions that, when executed by a second machine, cause the second machine to perform a computer implemented method comprising:

evaluate the provisionally unique identifier to determine whether the provisionally unique identifier is unique; and if not, sending a request to the network appliance to generate another provisionally unique identifier.

15. The non-transitory machine-accessible medium of claim 14, the method further comprising: signing the signed certificate in response to validating credential information of a user logged in at the network appliance.

16. A computing system, comprising:

a network appliance, to receive a user login, to determine whether a signed certificate exists on the network appliance, and if not, to automatically initialize the network appliance, wherein to automatically initialize the network appliance, the network appliance generates a provisionally unique identifier of the network appliance to be transmitted to a service provider; and the service provider networked with the network appliance, to receive a certificate signing request (CSR) from the network appliance, the certificate signing request including the provisionally unique identifier and time information associated with the CSR, and to sign a certificate for the network appliance if login credentials from the user login are recognized, the provisionally unique identifier is unique to the service provider, and the time information indicates that the CSR was received within a predetermined time period.

17. The computing system of claim 16, further comprising: a client networked with the network appliance to permit a user to login to the network appliance.

18. The computing system of claim 16, wherein the provisionally unique identifier is not known beforehand by the service provider.

* * * * *